(12) United States Patent
Arnold et al.

(10) Patent No.: US 6,271,941 B1
(45) Date of Patent: Aug. 7, 2001

(54) ILLUMINANT HEAD ASSEMBLY FOR A PHOTOGRAPHIC FILM IMAGE SCANNER

(75) Inventors: Stephen C. Arnold, Honeoye Falls; Robert E. Ashe, Henrietta; Dana A. Carlile, Webster; Mary-Irene E. Condo, Rochester; Thomas D. Jensen; R. Winfield Trafton, both of Holley, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/084,062

(22) Filed: May 22, 1998

(51) Int. Cl.[7] ................................................. H04N 1/46
(52) U.S. Cl. .............................................. 358/509; 356/446
(58) Field of Search ........................... 358/474, 475, 358/487, 506, 509; 355/1, 40, 75; 399/219; 356/443, 444

(56) References Cited

U.S. PATENT DOCUMENTS

| | | | |
|---|---|---|---|
| 3,217,594 | 11/1965 | Simmon . | |
| 3,532,873 | 10/1970 | Batson et al. | 240/1 |
| 3,825,335 | 7/1974 | Reynolds | 355/1 |
| 3,825,336 | 7/1974 | Reynolds | 355/1 |
| 4,125,315 | 11/1978 | Altman et al. | 350/96.1 |
| 4,128,332 | 12/1978 | Rowe | 355/67 |
| 4,129,372 | 12/1978 | Allgeier | 355/1 |
| 4,240,738 | 12/1980 | Praamsma | 355/1 |
| 4,255,042 | 3/1981 | Armitage, Jr. et al. | 355/1 |
| 4,342,511 | 8/1982 | Routt, Jr. et al. | 355/1 |
| 4,783,700 | * 11/1988 | Nagane | 358/213.11 |
| 4,899,040 | 2/1990 | Davis et al. | 250/216 |
| 4,901,207 | 2/1990 | Sato et al. | 362/32 |
| 4,954,931 | 9/1990 | Hassler, Jr. | 362/32 |
| 5,031,078 | 7/1991 | Bornhorst | 362/32 |
| 5,061,029 | 10/1991 | Ishikawa | 385/132 |
| 5,327,328 | 7/1994 | Simms et al. | 362/26 |
| 5,414,489 | 5/1995 | Kaplan | 355/67 |
| 5,504,317 | 4/1996 | Takahashi | 235/462 |
| 5,515,136 | 5/1996 | Nishio et al. | 355/37 |
| 5,519,591 | 5/1996 | McCrary | 362/104 |
| 5,521,797 | 5/1996 | Kashima et al. | 362/31 |
| 5,535,021 | * 7/1996 | Chiang et al. | 358/474 |
| 5,575,549 | * 11/1996 | Ishikawa et al. | 362/31 |
| 5,726,790 | * 3/1998 | Tsai | 359/196 |
| 5,764,493 | * 6/1998 | Liao | 362/31 |
| 5,798,849 | * 8/1998 | Tsai | 358/475 |
| 5,923,411 | * 7/1999 | Roy et al. | 355/99 |
| 5,933,222 | * 8/1999 | Hoshino et al. | 355/75 |

* cited by examiner

Primary Examiner—Jerome Grant, II
(74) Attorney, Agent, or Firm—Francis H. Boos, Jr.; Roland R. Schindler, II (57) ABSTRACT

An illuminant head assembly for a photographic film image scanner includes a linear light source, preferably a linear array of spectrally distinct illuminant elements combined with a main body having an elongate light conducting channel aligned with the light source and having a light pipe in the light conducting channel, the light pipe having a light diffusion material dispersed therein. The illuminant head assembly in a preferred embodiment includes additional light sources at one or both ends of the linear array and the main body includes additional light channels aligned with the additional light sources, the additional light sources and channels serving as illuminant sources for scanning marginal regions of the photographic film in the film scanner.

18 Claims, 6 Drawing Sheets

ILLUMINANT HEAD ASSEMBLY FOR A PHOTOGRAPHIC FILM IMAGE SCANNER

CROSS REFERENCE TO RELATED APPLICATIONS

Cross reference is made to commonly assigned, copending U.S. Applications, filed concurrently herewith and entitled "ULTRAVIOLET CURABLE RIVETING OF PRECISION ALIGNED COMPONENTS", and Ser. No. 09/083,604 filed concurrently herewith and entitled "IMAGING APPARATUS FOR A PHOTOGRAPHIC FILM IMAGE SCANNER".

FIELD OF THE INVENTION

The present invention relates generally to the field of photographic media image scanners. More specifically, the invention relates to small, low cost scanners adapted for use with personal computers by consumers who wish to generate digital images from processed film stored in a film cartridge as in the case of the Advanced Photo System (APS) film.

BACKGROUND OF THE INVENTION

Users of personal home computers are increasingly loading digital image files into their computer for viewing, communicating images through the Internet and printing hardcopies on personal color printers. With the introduction of the Advanced Photo System, which stores processed film in the film cartridge, there is a growing interest in being able to scan and digitize images from the stored film for use on the personal computer. Such a scanner should not only be low cost, to obtain broad acceptance as a consumer product, but also needs to be compact in size to be able to fit into a standard disk drive bay on a personal computer.

In designing a film scanner for this type of application, it is important to have a design that uses a minimum of parts, is simple to manufacture and yet creates and maintains critical, micro-precision alignment of the photosensor with the film plane in the scan gate. The design of the present invention fully meets these objectives.

SUMMARY OF THE INVENTION

In accordance with one aspect of the invention therefore, there is provided an illuminant head assembly for a photographic media image scanner which comprises a linear light source and a main body having a first elongate planar light conducting channel aligned with the linear light source, wherein the light conducting channel includes a planar light pipe therein, the light pipe having a light diffusion material dispersed throughout the light pipe.

In accordance with another aspect of the invention, an illuminant head assembly is provided for a film scanner of the type having a scan gate and a pair of support arms on opposite sides of the scan gate, at least one of the support arms having a notch formed therein. In this aspect of the invention, the head assembly comprises a linear light source and a main body having a first elongate planar light conducting channel aligned with the linear light source, the light conducting channel including a planar light pipe therein, the light pipe having a light diffusion material dispersed throughout the light pipe. The main body has opposite side portions adapted to mate with the support arms of the film scanner. At least one of the side portions has a spring finger positioned to mate and lock into the notch in the support arms when the illuminant assembly is mounted into position on the support arms.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
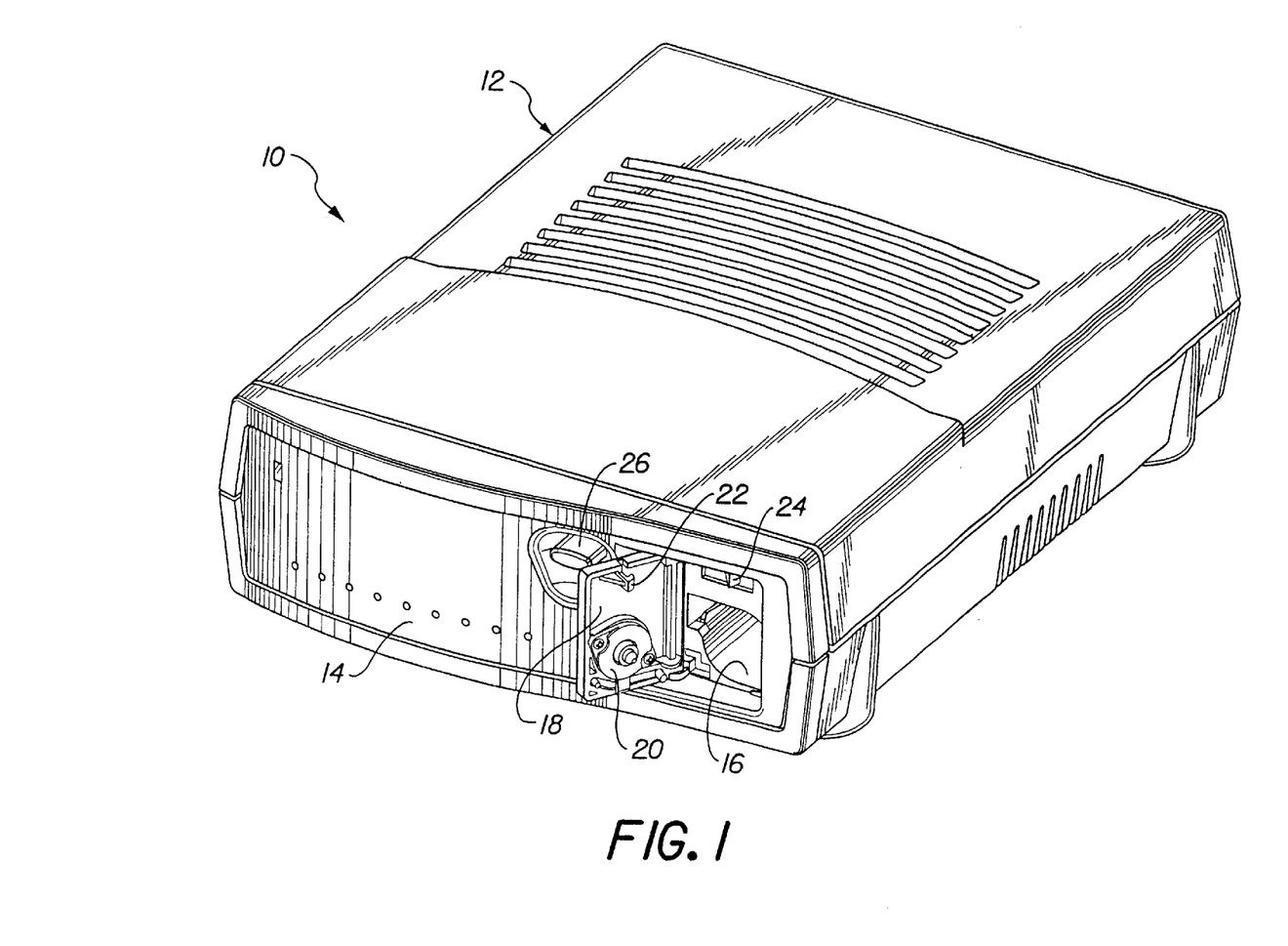
FIG. 1 is an isometric view showing a film scanner embodying the present invention.

In FIG. 1, there is shown a compact film scanner 10 adapted for use with APS film cartridges to convert film images to digital images. The illustrated scanner comprises an outer casing 12 and a front bezel 14 which enclose an internal film drive chassis to be described in more detail below. The chassis is provided with an APS film cartridge chamber 16 for receiving a manually inserted APS film cartridge. A hinged, spring-loaded door 18 includes a locating device 20 which acts to engage the end of the inserted film cartridge (not shown) as the door is closed to aid in properly positioning the film cartridge in the chamber 16. A latch hook 22 on the door engages an internal latching mechanism 24 to lock the door in the closed position. When it is desired to remove the film cartridge, a door release button 26 is actuated to unlock the latch mechanism allowing the door to spring open. An internal spring loaded mechanism (not shown) within the cartridge chamber forces the cartridge partially outward, allowing the user to grasp and remove the cartridge.

Figure 2:
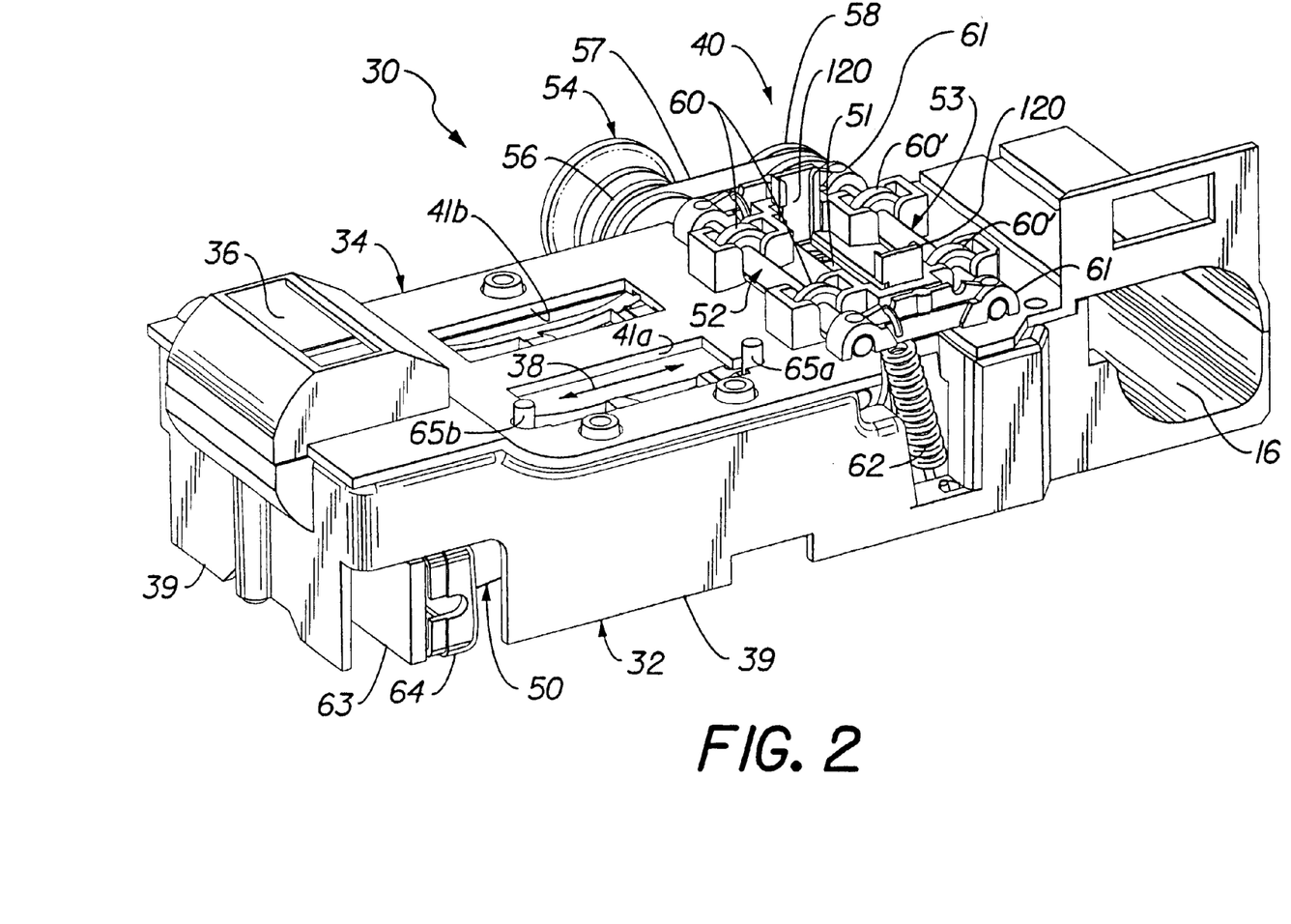
FIG. 2 is a perspective view of a film scanner chassis embodying the present invention.

Referring to FIG. 2, a general description of the internal film drive chassis 30 of the scanner 10 is presented here. The illustrated chassis comprises a lower frame 32 and an upper plate 34 which, when assembled as shown, define the film cartridge chamber 16, a film takeup chamber 36 and a film path 38 longitudinally extending between the two chambers. A film drive roller mechanism 40, including nip roller sets 52 and 53, is located near the film cartridge chamber 16. A pair of elongated apertures 41a, 41b are provided in upper plate 34 to allow access by magnetic read/write heads (not shown) to magnetic data tracks on the magnetic recording layer formed on the APS film as the film is driven along the film path, thereby enabling data transfer to and from the film magnetic layer, in known manner, as part of the film scanning process. Lower frame 32 is provided with depending skirt walls 39 that form a cavity in which is mounted imaging apparatus 50.

Figures 3, 3A:
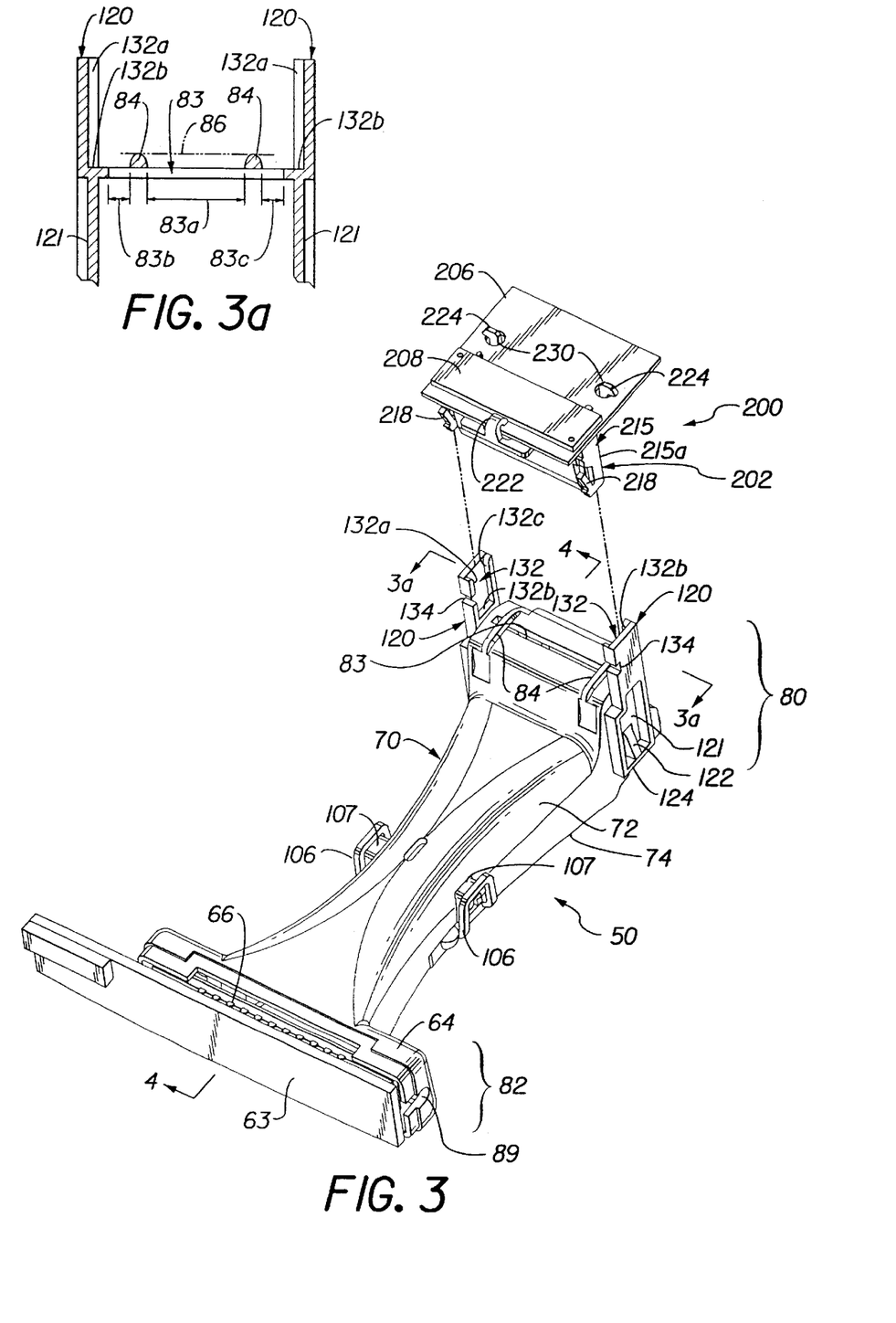
FIGS. 3 & 3a partially exploded perspective view of an imaging apparatus and illumination head embodying principles of the present invention.

One end of the imaging apparatus 50, as will be seen in reference to FIG. 3, comprises a film scanner end which is snap mounted into a film scanner opening 51 formed in the chassis 30. The film scanner end is straddled by film drive nip roller sets 52 and 53. The nip rollers are driven by a film drive stepper motor (not shown) which is directly coupled via drive gear 54 to main drive rollers beneath idler rollers 60 and, via main drive pulley 56, elastic drive belt 57 and slave drive pulley 58 to slave rollers beneath idler rollers 60'. Idler rollers 60 and 60' are held in place against their respect drive rollers by means of retention clamps 61 held under pressure by tension springs 62. The film scanner end of imaging apparatus 50 includes a pair of upstanding support arms 120 integrally formed on the imaging apparatus 50. The arms 120 comprise support mounts for an illuminant head assembly 200 (FIG. 3) constructed in accordance with the present invention as will be described more fully later. The other end of the imaging apparatus 50 comprises a sub-housing 64 which encloses a linear CCD photosensor device 66 (FIG. 3). The CCD is electrically mounted on a printed circuit board 63 but is physically supported directly from the sub-housing 64 as is more fully described in copending, commonly assigned U.S. application Ser. No. 09/083,359, the disclosure of which is incorporated herein by reference. The elongated housing of imaging apparatus 50 comprises the sole means of support of the CCD from the chassis frame 32. Spaced apart film guide pins 65a and 65b are located along one edge of the film path 38 to aid in accurately aligning magnet recording tracks on the APS film with the magnetic read/write heads positioned in the apertures 41a, 41b. The lower frame 32, upper plate 34 and housing body 72 are molded in the desired configurations out of a suitable, preferably blackened, 30% glass filled polycarbonate material held together by suitable fastening means (not shown), such as screws, snaps, adhesives and the like. The use of this material is highly beneficial in this application because of its stability in the presence of humidity and temperature changes which is particularly important in this configuration wherein the photosensor relies on the housing as the sole means of support from the scanning film plane.

Figure 4:
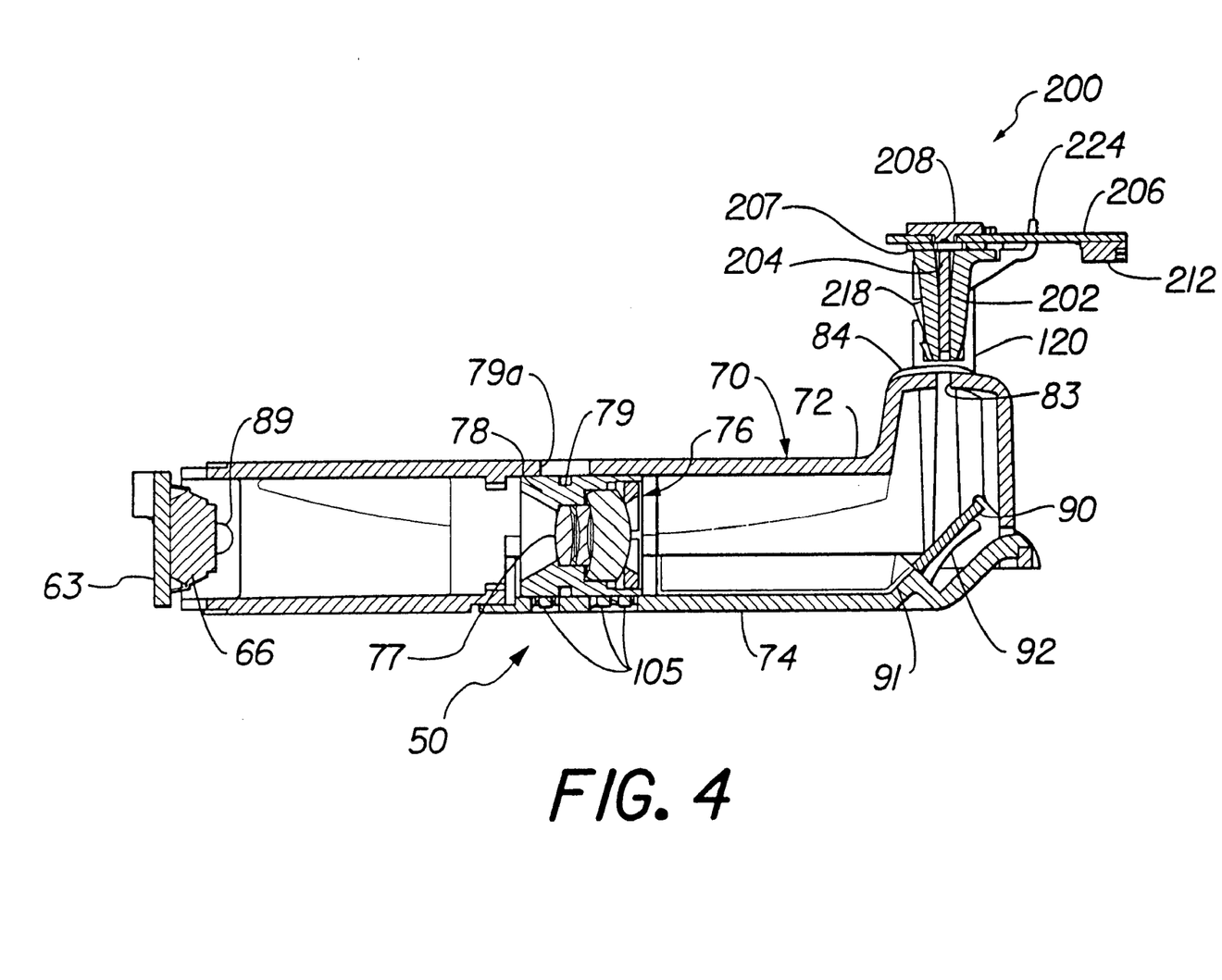
FIG. 4 is a cross section side elevation view of the imaging apparatus and illumination head of FIG. 3.

Referring jointly to FIGS. 3, 3a and 4, details of the imaging apparatus 50 will be described. Imaging apparatus 50 comprises a hollow, two-piece molded housing 70 having an upper, main body portion 72 and a separable, lower body portion 74. One end 80 of the housing 70 comprises a film scanning portion and the other end 82 comprises a light sensor portion. The film scanning end 80 includes an elongated light entry slot 83. As best seen in FIG. 3a, a pair of film rails 84 are integrally molded onto the end of the imaging apparatus so as to bridge the slot 83 longitudinally in the direction of film path 38 to thereby define a film plane 86. For this purpose, the film rails 84 are spaced apart only slightly more than the lateral dimension of the negative image on the film strip so as to define a first scanning aperture 83a coincident with images on the film. The portions 83b and 83c extending beyond the rails 84 define secondary scan apertures, each of which is coincident with a respective edge region of the film. The other end 82 of the housing 70 includes sub-housing 64 which encloses linear CCD 66 mounted on printed wiring board 63. As described in aforementioned copending application Ser. No. 09/083,359, CCD 66 is supported from sub-housing 64 by means of radiation, preferably UV, curable adhesive "rivets" (not shown). Notch 89, and a similar notch on the far side of sub-housing 64, allow access by the UV radiation to the adhesive material inside the sub-housing 64 during the curing step.

The upper body portion 72 of the housing 70 is formed at right angles between the scanning end 80 and the photosensor end 82 to provide a compact structure enabling mounting of the film scanner 10 in a drive bay of a personal computer. To this end, a mirror 90 is mounted internally against ridges 91 formed inside the upper housing body 72 at a 45° angle to serve as reference datum surfaces for mounting of the mirror 90. The mirror is held in place against the ridges 91 by means of compressive spring fingers 92 formed on the housing lower body portion 74. Internally of housing body portions 72 and 74, about half way between mirror 90 and CCD 66, a focusing lens assembly 76 is mounted in axial alignment with the light path from the scanning end 80 via the mirror 90 to the photosensor end 82. The focusing lens assembly 76 includes a focusing lens set 77 positioned within a cylindrical lens mount 78. The lens mount 78 is provided with a circumferential groove 79 for use in setting the focus position of the lens 76 during assembly and alignment of the imaging apparatus. To this end, the housing upper body portion 72 is provided with an adjustment slot 79a extending longitudinally of the housing 70. During the assembly process, a probe can be inserted through the slot 79a into engagement with groove 79 to move the lens mount 78 axially to focus the film plane 86 onto the CCD sensor 66. Flexible spring fingers with pressure pads 105 are molded into the lower body portion 74 to temporarily hold the lens mount 78 in place after the upper and lower body portions are assembled together until focusing alignment is completed, at which time the lens is permanently retained by adhesive injected through either one or both of the space bridging the spring fingers with the lens mount 78 and the lens adjustment slot 79a in the upper body portion 72, preferably the latter. As is described more filly in copending application Ser No. 09/083,604, (U.S. Pat. No. 6,178,016) the disclosure of which is incorporated herein by reference, Upper and lower body portions 72 and 74, when assembled together as shown, are held together by U-shaped spring clamp arms 106 on lower body portion 74 snapped over retention tabs 107 formed on upper body portion 72.

Integrally formed on the outer lateral sides of the scanning end 80 of the housing 70 are a pair of support arms 120 that serve the dual functions of supporting the housing 70 on the chassis lower frame 32 and rigidly supporting a illuminant head assembly 200 in precise position over the light entry slot 83. The support arms are preferably integrally molded on the upper body 72 and are mirror images of each other. The lower portion of the support arm 120 includes a recessed portion 121 at the bottom of which there is provided a ramp 122 leading to the lower retention edge 124. The upper portions of each of the support arms 120 are provided with a channel 132 and notches 134, the purpose of which is explained below. As is described more fully in copending application Ser. No. 09/083,604, the chassis lower frame 32 includes a pair of integrally molded, downwardly extending retention hook arms that are springlike and flex outwardly to permit insertion of the scanning end 80 of the illumination housing 70 onto the chassis lower frame 32. During assembly of the imaging apparatus 50 to the lower chassis frame 32, the chassis frame 32 is turned upside-down and the scanning end 80 is inserted into the opening 51. During this snap-in step, the hooks at the end of the retention arms initially fall into the recessed portions 121 and eventually engage the ramps 122 at which point the retention arms are flexed outwardly until the retention hooks grab and hold the housing assembly by engagement with the retention edges 124. The scanning end of the housing is now rigidly and securely captured between the retention arms. Once this is completed, the lower frame 32 can be turned right side up for addition of the drive roller sets 52 and 53 and the upper chassis plate 34. As can best be seen in FIG. 2, the upper portions of the support arms extend above the chassis 30. As will be seen, this allows insertion of an illuminant head assembly 200 into the channels 132 of the support arms.

Referring jointly to FIGS. 3–6, the illuminant head assembly 200 of the present invention will now be described. The illuminant head assembly 200 comprises a main body 202, a planar light pipe 204, a printed circuit board 206 on which are mounted a linear array of red, green and blue LEDs 206a and additional LEDs 206b and 206c positioned at opposite ends of the linear array 206a. The linear array provides spectral red, green and blue illuminant for scanning of image areas on the film. The additional LEDs serve as respective sources of light for reading of bar code data (LED 206b) and for sensing of reference perforations in the film (LED 206c). Preferably, LED 206b emits in the red spectrum. However, since Dmin density of the film is almost transparent in the red spectrum, LED 206c is selected to emit in another color spectrum such as green or blue. A heat sink panel 208 is mounted on the opposite side of the circuit board from the LEDs 206a–206c. An apertured panel 207 is mounted over the LEDs on the circuit board and is provided with an elongated aperture 207a aligned with the linear LED array 206a and two smaller apertures 207b and 207c aligned with LEDs 206b and 206c, respectively. Panel 207 serves as a dam to retain a clear silicone sealant disposed in each of the apertures 207a–207c. The circuit board 206 also carries a connector 212 providing power connections to the LEDs from a microcontroller (not shown).

Figure 5:
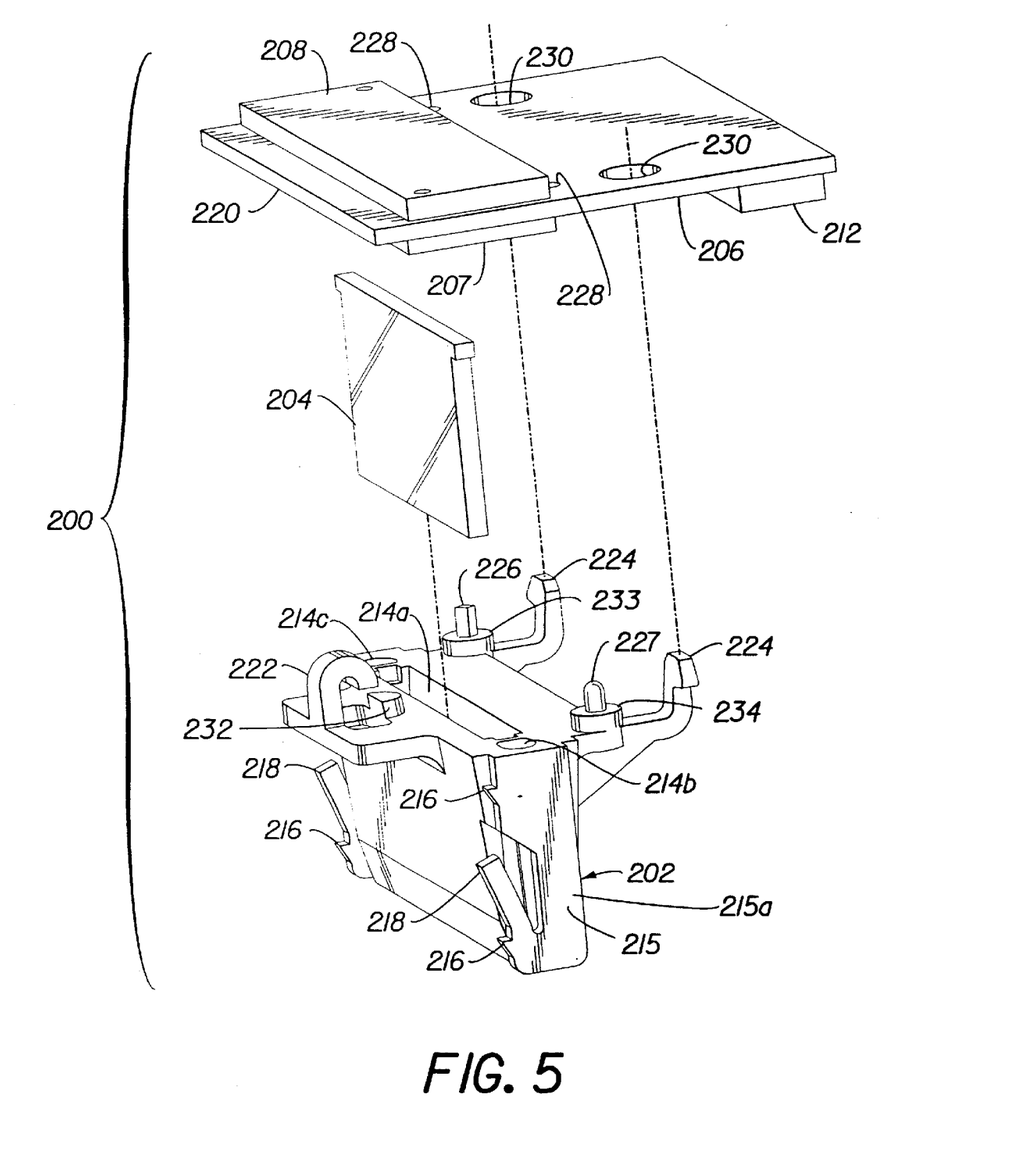
FIG. 5 is an exploded perspective view from above of the illumination head shown in FIGS. 3, 3a and 4.
Figure 6:
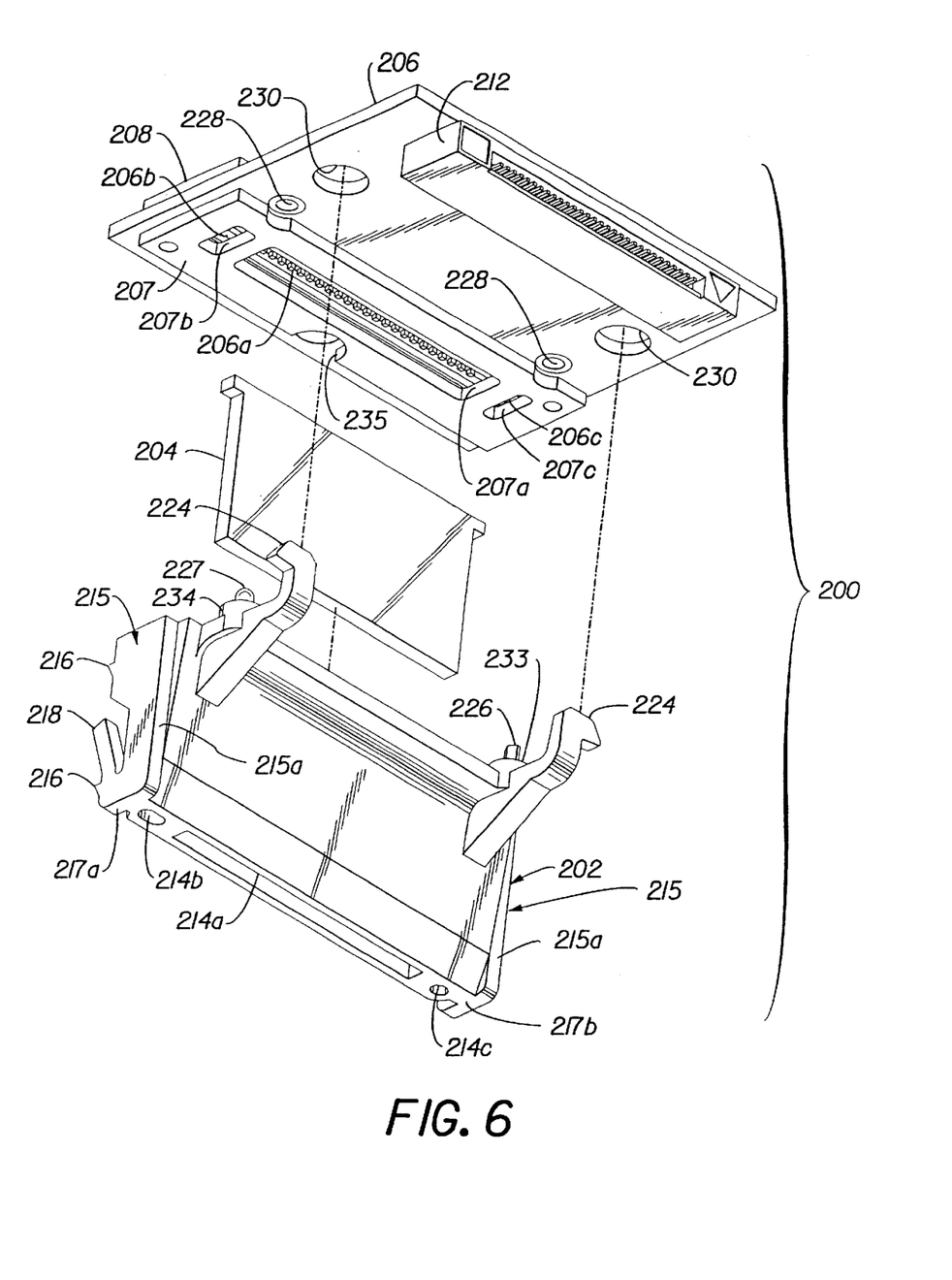
FIG. 6 is an exploded perspective view from below of the illumination head shown in FIGS. 3, 3a and 4.

The main body 202, made of a suitable highly reflective, white polycarbonate material, is provided with an elongated, planar light channel 214a into which light pipe 204 is inserted. Light pipe 204 is preferably made from a clear polymethylmethacrylate material loaded with a diffusion material such as barium sulfate at loadings of about 0.1% to about 1.0% by weight and preferably about 0.25% by weight. The particle size of the barium sulfate ranges between about 5–20 microns. The balancing of the interaction of the length of the light pipe, the loading of barium sulfate and the particle size of the barium sulfate allow for a diffuse light output at the bottom outlet of the elongated light channel 214a without the need for any special surface finish on the light pipe or the addition of a separate diffusion component. Thus the barium sulfate loaded light pipe 204 serves as the sole light diffusing agent for exposure of the LED light sources to the film being scanned. Smaller side channels 214b and 214c, which do not have light pipes therein, serve to convey the illumination from LEDs 206b and 206c, respectively, to the bar coded data and reference perforations along the longitudinal edges of the film. The sides 215 of the main body 202 are shaped to fit into the channels 132 of the previously described support arms 120. Pointed crush ribs 216, which engage the edges 132a of the channels 132, ensure a tight fit of the body sides 215 in the channels as well as align edge surfaces 215a to edge surfaces 132c of the channels 132. By dimensioning and controlling, during manufacture, the position of surface 215a to the elongate light channel 214a, the alignment of the elongate light channel 214a to the elongate light entry slot 83 is maintained without subsequent adjustment.

Sides 215 of the main body are also provided with locking tabs 218 which engage notches 134 in the support arms to rigidly lock the head assembly into the support arm structure. The locking tabs 218 are integrally molded as part of the main body. The length width and depth of the locking tabs are such that, during assembly, the tabs deflect to allow insertion then spring back into position and contact the notches 134 preventing any movement up and out of the channels 134. This action maintains alignment of surfaces 217a and 217b (FIG. 6) to surfaces 132b at the bottom of the channels 132. The parts of the head assembly are easily snapped together by slipping end 220 of the printed wiring board under a capture hook 222 formed on the main body 202 and rotating the printed wiring board down until the under surface of the printed wiring board rests on the upper surfaces of support pads 232, 233 and 234. Aperture panel 207 is provided with a semicircular shaped notch 235 which mates with the semicircular shaped support pad 232. Support pad 232 and notch 235 serve to initial locating means for assembly of the light sources to the main body. Support pad 233 is provided with a diamond shaped locating pin 226 and support pad 234 is provided with a circular locating pin 227. Each of the pins mate with corresponding locating holes 228 on the circuit board. As such, both pins serve to set the alignment of the LEDs 206a, 206b and 206c to the elongate light channels 214a, 214b and 214c during assembly. When the board is fully rotated into position on the support pads, snap locking hooks 224 on the main body engage mating locking holes 230 in the printed wiring board to securely hold the board in place on the main body. The arrangement described is a simple, practical self-aligning mounting arrangement for attaching the head assembly 200 in a secure and rigid manner to the imaging apparatus 50.

It will be appreciated from the foregoing description that what has been described is an illuminant head assembly of simple and compact design that is provided with snap lock features that facilitate rapid assembly and that precisely and rigidly positions the LED light elements in place over the scanning aperture 83 of the imaging aperture without the requirement for additional fasteners. The use of an elongated light pipe with diffusion material in the light pipe simplifies the cost and complexity of the head design by eliminating the need for a separate diffusion element at the outlet of elongated channel 214. Additionally, the incorporation of spectrally discrete, e.g. red, green and blue, separate illumination elements enables independent adjustment of the spectral components of the film scanning illumination.

The invention has been described in detail with particular reference to certain preferred embodiments thereof, but it will be understood that variations and modifications can be effected within the spirit and scope of the invention.

PARTS LIST 10 film scanner
12 outer casing
14 front bezel
16 film cartridge chamber
18 spring-loaded door
20 locating device
22 door latch hook
24 door latching mechanism
30 film drive chassis
32 lower frame
34 upper plate
36 film takeup chamber
38 film path
40 film drive roller mechanism
41a,b read/write head apertures
50 imaging apparatus
51 film scanner opening
52 nip roller set
53 nip roller set
54 drive gear
56 main drive pulley
57 elastic drive belt
58 slave drive pulley
60,60' idler rollers
61 retention clamps 62 retention springs
63 printed circuit board
64 sub-housing
65a,b,c film guide pins
66 linear CCD photosensor
70 imaging apparatus housing
72 upper body portion
74 lower body portion
76 focusing lens assembly
77 focusing lens set
78 lens mount
79 lens mount groove
79a lens adjustment slot
80 film scanning end
82 photosensor end
83 elongated light entry slot
84 film rails
86 film plane
89 sub-housing notch
90 mirror
91 mirror mount ridges
92 compressive spring fingers
102 lens mount collar segment
105 pressure pads
106 cantilevered retention arm
107 retention tabs
120 support arms
121 recesses
122 ramp
132a,b,c channel
134 locking notch
200 illuminant head assembly
202 main body
204 planar light pipe
206 printed circuit board
206a linear R, G, B LED array
206b,c red LEDs
207 apertured panel
207a,b,c apertures
208 heat sink panel
212 connector
214a,b,c light channels
215 body sides
216 crush ribs
218 locking tabs
220 end of printed wiring board
222 capture hook
224 locking hooks
226–7 locating pins
228 alignment holes
230 locking holes
232–4 support pads
235 locating notch

What is claimed is:

1. An illuminant head assembly for a photographic media image scanner comprising:
   a linear light source; and
   a main body having a first elongate planar light conducting channel aligned with said linear light source, said light conducting channel including a planar light pipe therein, said channel and light pipe lying in a plane perpendicular to said photographic media and parallel to said linear light source, the light pipe having a light diffusion material dispersed throughout the light pipe as a sole light diffusing agent wherein said scanner comprises a film drive chassis with a film path having an elongate first scanning aperture coincident with image frames on the film and a second scan aperture coincident with an edge region of said film, the illuminant head assembly further comprising said planar light conducting channel having a length substantially coincident with the length of the first scanning aperture, and having a second light conducting channel adapted to be in alignment with said second scan aperture.

2. The illuminant head assembly of claim 1, wherein said diffusion material consists of barium sulfate.

3. The illuminant head assembly of claim 2 wherein the light pipe has a barium sulfate loading of within a range of about 0.1%–1.0% by weight and the barium sulfate has a particle size in the range of about 5–20 microns.

4. The illuminant head assembly of claim 3 wherein the barium sulfate loading is about 0.25% by weight.

5. The illuminant head assembly of claim 1 wherein said linear light source includes a linear array of spectrally distinct LED light sources extending at least across said elongate light conducting channel.

6. An illuminant head assembly for a photographic media image scanner comprising:
   a linear light source; and
   a main body having a first elongate planar light conducting channel aligned with said linear light source, said light conducting channel including a planar light pipe therein, said channel and light pipe lying in a plane perpendicular to said photographic media and parallel to said linear light source, the light pipe having a light diffusion material dispersed throughout the light pipe as a sole light diffusing agent wherein said scanner comprises a film drive chassis with a film path having an elongate first scanning aperture coincident with image frames on the film and first and second scan apertures coincident with opposite edge regions of said film, the illuminant head assembly further comprising said main body having a length substantially coincident with the length of the first scanning aperture, and having first and second light conducting channels adapted to be in alignment with said first and second scan apertures, respectively.

7. The illuminant head assembly of claim 6, wherein said diffusion material consists of barium sulfate.

8. The illuminant head assembly of claim 7 wherein the light pipe has a barium sulfate loading of within a range of about 0.1%–1.0% by weight and the barium sulfate has a particle size in the range of about 5–20 microns.

9. The illuminant head assembly of claim 8 wherein the barium sulfate loading is about 0.25% by weight.

10. The illuminant head assembly of claim 6 wherein said linear light source includes a linear array of spectrally distinct LED light sources extending at least across said elongate light conducting channel.

11. An illuminant head assembly for a film scanner, the scanner having a scan gate and a pair of support arms on opposite sides of said scan gate, at least one of the support arms having a notch formed therein; the head assembly comprising:
   a linear light source; and
   a main body having a first elongate planar light conducting channel aligned with said linear light source, said light conducting channel including a planar light pipe therein, the light pipe having a light diffusion material dispersed throughout the light pipe, said channel and light pipe lying in a plane perpendicular to said film and parallel to said linear light source, said main body having opposite side portions adapted to mate with said support arms and at least one of said side portions having a spring finger positioned to mate and lock into said notch when said illuminant assembly is mounted into position on said support arms.

12. The illuminant head assembly of claim 11 wherein both said support arms include a notch formed therein and said main body includes a pair of side portions each of which is adapted to mate with a corresponding one of said support arms, and each of said side portions includes a spring finger positioned to mate and lock into said notch when said illuminant assembly is mounted into position on said support arms.

13. The illuminant head assembly of claim 11 wherein said film scanner support arms have elongated channels formed therein and said main body side portions are shaped to mate with said channels, the side portions including a plurality of crush ribs positioned to engage edges of said channels to hold said main body rigidly within and aligned to said channels when said head assembly is mounted on said support arms.

14. The illuminant head assembly of claim 11 wherein said linear light source comprises a substrate and a line of spectrally distinct light sources mounted on said substrate, the substrate having a plurality of apertures therein;

the main body includes a plurality of support pads providing reference datum support surfaces for said light source substrate, a substrate retention hook adjacent one of said support pads, a further pair of said support pads having reference datum locating posts extending from the reference datum support surfaces thereof in alignment with a corresponding pair of said apertures in said substrate, and at least one further locking hook adapted to engage said substrate when mounted on said reference datum support surface thereby to hold said substrate rigidly in position on said main body with said linear light source in alignment with said elongated light channel.

15. An illuminant head assembly for a film scanner apparatus of the type having a linear scanning aperture and a pair of spaced apart film rails bridging said scanning aperture at a width of image frames on the film strip, said film rails defining a first scanning aperture region therebetween corresponding to said image frame width and at least a second scanning aperture region outside said film rails in alignment with a first feature of the film along a first marginal region of the film; the illuminant head assembly comprising:

a main body having a first elongate planar light conducting channel coextensive with said first scanning aperture;

a second light conducting channel aligned with said second scanning aperture region;

a third light conducting channel directed toward said third scanning aperture region; and a light source panel mounted on said main body and having a linear array of spectrally distinct light sources aligned with said first light conducting channel, a second light source aligned with said second light conducting channel and a third light source aligned with said third light conducting channel.

16. The illuminant head assembly of claim 15 wherein said linear array of light sources comprises light emitting diodes of at least different colored spectral emissions.

17. The illuminant head assembly of claim 15 wherein said linear array of light sources comprises interleaved red, green and blue light emitting diodes.

18. An illuminant head assembly for a photographic media image scanner comprising:

a light source having more than one spectrally distinct lights; and a main body having a first elongate light conducting channel aligned with said light source, said light conducting channel including a light pipe therein, to guide the light from the light source to the photographic media with the light pipe having a light diffusion material dispersed throughout the light pipe as a sole light diffusing agent, wherein the light pipe defines an elongate path to diffuse the light from the light source so that the light that is emitted from light pipe is a spectrally consistent combination of the light.

* * * * *